(12) United States Patent
Tenstam

(10) Patent No.: US 10,737,734 B2
(45) Date of Patent: Aug. 11, 2020

(54) WIND DEFLECTOR ARRANGEMENT

(71) Applicant: VOLVO TRUCK CORPORATION, Gothenburg (SE)

(72) Inventor: Anders Tenstam, Öjersjö (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 77 days.

(21) Appl. No.: 16/063,176

(22) PCT Filed: Dec. 21, 2015

(86) PCT No.: PCT/EP2015/080774
§ 371 (c)(1),
(2) Date: Jun. 15, 2018

(87) PCT Pub. No.: WO2017/108076
PCT Pub. Date: Jun. 29, 2017

(65) Prior Publication Data
US 2019/0009839 A1      Jan. 10, 2019

(51) Int. Cl.
*B62D 35/00* (2006.01)
(52) U.S. Cl.
CPC .................................. *B62D 35/001* (2013.01)
(58) Field of Classification Search
CPC ..................................................... B62D 35/001
See application file for complete search history.

(56) References Cited

U.S. PATENT DOCUMENTS 7,876,202 B2 * 1/2011 Liljeblad .............. B62D 35/001
296/155

8,496,285 B2   7/2013 Rogers et al.
2012/0038183 A1   2/2012 Brewer

FOREIGN PATENT DOCUMENTS

| DE | 3619959 A1 | 12/1987 |
|---|---|---|
| DE | 10160943 A1 | 6/2003 |
| DE | 102008056357 A1 | 5/2010 |
| DE | 102015002715 A1 | 9/2015 |
| EP | 2626281 A1 | 8/2013 |
| GB | 2435246 A | 8/2007 |
| GB | 2465393 A | 5/2010 |
| WO | 2014133424 A1 | 9/2014 |

OTHER PUBLICATIONS

International Search Report (dated Sep. 14, 2016) for corresponding International App. PCT/EP2015/080774.

* cited by examiner

*Primary Examiner* — D Glenn Dayoan
*Assistant Examiner* — Melissa Ann Bonifazi
(74) *Attorney, Agent, or Firm* — Withrow & Terranova, PLLC

(57) ABSTRACT

A wind deflector arrangement includes a wind deflector configured to reduce air resistance, the wind deflector being arranged on a cab roof of a vehicle, the wind deflector being pivotable around a substantially transversal axis of the vehicle, wherein the wind deflector arrangement further includes at least one air pressure sensor for measuring an air pressure during traveling of the vehicle, wherein the at least one air pressure sensor is arranged within a space formed by the wind deflector and the cab roof of the vehicle. A method for controlling a wind deflector arrangement and a vehicle including such a wind deflector arrangement are also provided.

23 Claims, 7 Drawing Sheets

WIND DEFLECTOR ARRANGEMENT

BACKGROUND AND SUMMARY

The present invention relates to a wind deflector arrangement for a vehicle. The invention also relates to a vehicle comprising such wind deflector arrangement and a method for controlling the wind deflector arrangement. The invention is applicable on vehicles, such as e.g. low-, medium- or heavy duty vehicles also commonly referred to as trucks. Although the invention will mainly be described in relation to a truck, it may also be applicable for other types of vehicles, preferably vehicles comprising a tractor unit and a trailer unit, of which reduction of air resistance is of particular interest.

In the field of vehicles, in particularly low-, medium- and heavy duty vehicles commonly referred to as trucks, it is well known that air resistance generates unfavorable forces during traveling, leading to e.g. reduced speed and increased fuel consumption. Normally, air resistance on a vehicle can be located to certain areas, such as the front surface of the vehicle, i.e. the wind shield, hood, etc. One area that is especially exposed to air resistance is the area of an associated trailer which area of the trailer is located above and behind the cab compartment of the vehicle. The upper part of the trailer front end which is exposed to the wind constitutes an important area of aerodynamic drag. It is thus desirable to reduce the air resistance at this position in order to e.g. reduce fuel consumption, etc.

To reduce air resistance, vehicles are often designed with a streamlined and thus more favorable aerodynamic shape. A common solution is to provide the vehicle with spoilers or air/wind deflectors so that the airflows can be diverted around the vehicle. On on-highway trucks, air/wind deflectors are normally located on top of the vehicle cab, i.e. on the vehicle cab roof.

GB 2465393 describes an air deflector system for use on a commercial vehicle. The wind deflector in GB 2465393 is arranged to reduce the aerodynamic drag whilst the vehicle is in motion. The vehicle receives input relating to the aerodynamic profile of the vehicle, including geometry of e.g. a trailer connected to the vehicle. Hereby, the wind deflector is set at a predetermined position. The vehicle comprises a control unit which receives current vehicle speed and air pressure values from air pressure sensors arranged on the surface of the vehicle, wherein the control unit controls the position of the wind deflector in response to the air pressure and vehicle speed. Thus, based on vehicle speed and air pressure values, the predetermined position of the wind deflector may be changed. However, the wind deflector system in GB 2465393 is still in need of further improvements in terms of e.g. further improving the positioning of the wind deflector to reduce air resistance.

It is desirable to provide a wind deflector arrangement which improves the positioning of the wind deflector in comparison to the prior art.

According to a first aspect of the present invention, there is provided a wind deflector arrangement comprising a wind deflector configured to reduce air resistance, the wind deflector being arranged on a cab roof of a vehicle, the wind deflector being pivotable around a substantially transversal axis of said vehicle, wherein the wind deflector arrangement further comprises at least one air pressure sensor for measuring an air pressure during traveling of the vehicle, wherein the at least one air pressure sensor is arranged within a space formed by the wind deflector and the cab roof of the vehicle.

It should be readily understood that the wind deflector does not necessarily have to be directly connected to the cab roof of the vehicle since an intermediate arrangement, such as a casing or a hood or the like, may be arranged between the cab roof structure and the wind deflector. Hence, the wording "wind deflector arranged on a cab roof" should in the following and throughout the description be understood to also include that the wind deflector may be mechanically connected to the cab roof via an intermediate structure.

Further, it should be readily understood that the air pressure is measured within the space formed by the wind deflector and the cab roof of the vehicle. An air pressure sensor arranged outside of this space but comprising means for measuring the air pressure within the space is thus naturally also included within the meaning of the wording "air pressure sensor is arranged within a space formed by the wind deflector and the cab roof of the vehicle". The air pressure sensor is thus arranged to obtain air pressure data within the space formed by the wind deflector and the cab roof of the vehicle for optimizing the position of the wind deflector.

The present invention is based on the unexpected insight that the pressure level within the space formed by the wind deflector and the cab roof of the vehicle correlates relatively well with the aerodynamic drag of the vehicle. In detail, it is an inverse correlation, or anti-correlation, since a relatively high air pressure level within the space formed by the wind deflector and the cab roof of the vehicle corresponds to a relatively low drag, i.e. low air resistance, at an upper portion of a trailer or cargo arranged behind the cab of the vehicle.

An advantage of the present invention is thus that the wind deflector can be arranged at a position corresponding to a relatively high air pressure within the space formed by the wind deflector and the cab roof of the vehicle. Hereby, it can be assured that the aerodynamic drag of the vehicle is relatively low. The static pressure within the formed by the wind deflector and the cab roof of the vehicle thus reaches a relatively maximum level as the aerodynamic drag reaches a relatively minimum level. Hence, and as will be described further below, it is possible to automatically arrange the wind deflector in a position for substantially reducing the aerodynamic drag of the vehicle. This in turn will reduce vehicle fuel consumption, etc. Also, the at least one air pressure sensor is arranged at a relatively protected space between the wind deflector and the cab roof of the vehicle, thus being relatively insensitive to the rather harsh environment of dust, dirt and debris from the road, as well as from the weather-incurring objects prone to pollute the area around the vehicle.

A further advantage is that the vehicle operator is not in need of manually adjusting the wind deflector if changing to a trailer or cargo having another height in comparison to the previously used trailer/cargo, since the wind deflector can be automatically positioned in a more or less "optimum" position. In comparison to the above described prior art, the present invention does not have to rely on a predetermined aerodynamic profile to arrange the wind deflector at an optimal position.

According to an example embodiment, the wind deflector may be configured to reduce air resistance of a rear part of the vehicle, wherein a height of the rear part is higher than a height of the cab roof of the vehicle.

The rear part may be a trailer of the vehicle, which trailer may comprise a connectable container or other cargo having a height which is higher than the height of the cab roof of the vehicle. The vehicle does not necessarily have to comprise a trailer. In such case, the rear part may be formed by a container/cargo which is integrated in the tractor unit of the vehicle. The rear part is thus arranged behind the cab of the vehicle as seen in the forward driving direction. The following will however refer the rear part as the trailer or the cargo. The cargo may, for example, be an integrated part of the tractor, or rigid vehicle, and the adjustment of the roof deflector may be executed in response to a variable height of the cargo.

According to an example embodiment, the wind deflector arrangement may comprise a control unit connected to the at least one air pressure sensor.

Hereby, the at least one air pressure sensor may transmit signals to the control unit which in turn may control the wind deflector or further transmit the signal to another control unit of the vehicle for controlling the wind deflector.

According to an example embodiment, the control unit may be configured to control an angular displacement of the wind deflector around the substantially transversal axis.

It should however be understood, as is also described above, that the control unit may also transmit the signal to another control unit of the vehicle for controlling the angular displacement of the wind deflector. The angular displacement may be controlled by means of controlling e.g. an actuator or the like connected to the wind deflector.

According to an example embodiment, the at least one air pressure sensor may be arranged on the cab roof of the vehicle.

Hereby, an advantage is that in case a new trailer, which is provided with e.g. a container or the like which is higher than the container previously connected to the trailer, the air pressure phenomena can be detected by positioning the at least one air pressure sensor on the cab roof of the vehicle, or on a structure arranged on the cab roof of the vehicle. Thus, arranging the at least one air pressure sensor on the cab roof of the vehicle is advantageous when optimizing the positioning of the wind deflector in response to a varying trailer height.

According to an example embodiment, the at least one air pressure sensor may be arranged on a surface of the wind deflector facing the cab roof of the vehicle.

Hereby, similar advantages as positioning the at least one air pressure sensor on the cab roof, in the space between the wind deflector and the cab roof, of the vehicle can be obtained.

According to an example embodiment, the wind deflector arrangement may comprise a plurality of air pressure sensors mutually spaced apart from each other in the transversal direction of the vehicle.

Hereby, an advantage is that the plurality of air pressure sensors may provide improved measurements when the vehicle is exposed to e.g. side winds, etc. Also, by using more than one air pressure sensor improves the measurement reliability, inflicted for example by an unforeseen local phenomenon connected to a substantially specialized embodiment, or malfunction of one or more of the pressure sensors. According to an example, the plurality of air pressure sensors may be arranged on a substantially transversal geometric axis of the vehicle.

According to an example embodiment, the air pressure sensor may comprise an additional air pressure sensor arranged on an external surface of the vehicle cab facing away from a forward driving direction of the vehicle.

The additional air pressure sensor may thus be arranged in combination with the at least one air pressure sensor arranged within the space formed by the wind deflector and the cab roof of the vehicle. An advantage is that pressure differences that occurs due to an increased/decreased distance from the cab to the trailer can be obtained by means of the additional air pressure sensor. Accordingly, when changing to a trailer having e.g. an increased distance to the vehicle cab in relation to the previously connected trailer, the wind deflector can be substantially optimally adjusted to reduce the air resistance that would occur due to the new distance to the trailer. Furthermore, by combining the air pressure sensor arranged within the space formed by the wind deflector and the cab roof of the vehicle and the additional air pressure sensor is advantageous since it will detect air pressures differences arising from both the increased/decreased height of the trailer as well as from the increased/decreased distance to the trailer. Furthermore, by using the additional air pressure sensor in combination with the at least one air pressure sensor, a control unit may collect information from both of these sensors and, with the aid of a control algorithm, take into account primarily those sensors that will display the expected behavior. For example, if environmental conditions would in a special case dismiss proper and expected function of at least one of the sensors, the control signal from this at least one sensor may be disregarded at that special moment.

According to an example embodiment, the at least one air pressure sensor may be a differential air pressure sensor comprising at least one air pressure measuring device arranged within the space formed by the wind deflector and the cab roof of the vehicle and at least one reference air pressure measuring device.

A differential air pressure sensor is beneficial since it provides accurate and relatively reliable measurement values.

According to an example embodiment, a control unit may be configured to measure a difference in pressure level between the at least one air pressure measuring device and the at least one reference air pressure measuring device.

The control unit may be the same control unit as described above which is connected to the air pressure sensor.

According to an example embodiment, the at least one reference air pressure device may be arranged in front of the substantially transversal axis as seen in the forward driving direction of the vehicle, or within the cab compartment of the vehicle.

The area in front of the substantially transversal axis or within the cab compartment are areas with relatively stationary pressure levels and thus beneficial to use as reference values. Other positions are also conceivable, such as any position within a volume encompassing the whole tractor unit, in which the pressure level is substantially stationary, or constant, or in general even substantially linearly varying with the stroke of the roof deflector.

According to an example embodiment, the at least one air pressure sensor may be an absolute air pressure sensor arranged to measure an absolute air pressure. Hereby, an advantage is that no reference measuring device is needed. Hence, a reference pressure position is not needed to be located.

According to a second aspect of the present invention, there is provided a vehicle comprising a vehicle cab compartment and a wind deflector arrangement as described above in relation to the first aspect of the present invention, wherein the wind deflector arrangement comprises a wind deflector mounted on a cab roof of the vehicle and configured to reduce air resistance of the vehicle.

According to an example embodiment, the vehicle may further comprise a truck unit comprising the cab compartment, and a rear part arranged behind the truck unit as seen in the forward driving direction of the vehicle, wherein a height of the rear part is higher than a height of the cab roof of the vehicle.

Effects and features of the second aspect are largely analogous to those described above in relation to the first aspect.

According to a third aspect of the present invention there is provided a method for controlling a wind deflector arrangement comprising a wind deflector for reducing air resistance, the wind deflector being arranged on a cab roof of a vehicle, the wind deflector being pivotable around a substantially transversal axis and movable between a first and a second position, wherein the wind deflector arrangement comprises at least one air pressure sensor arranged within a space formed by the wind deflector and the cab roof of the vehicle for measuring an air pressure, the method comprising the steps of measuring the air pressure within the space formed by the wind deflector and the cab roof of the vehicle for at least two different positions of the wind deflector; determining which of the at least two different positions of the wind deflector corresponds to the highest measured air pressure; and positioning the wind deflector in the position corresponding to the highest measured air pressure.

The first position of the wind deflector should be understood to mean a lower position or an upper position of the wind deflector. The second end position should thus be understood to mean the other one of the lower position or the upper position of the wind deflector. According to a non-limiting example, the lower position may be a lower end position of the wind deflector, and the upper position may be an upper end position of the wind deflector. In further detail, in the lower end position the distance between the vehicle cab roof and the inner surface of the wind deflector facing the cab roof of the vehicle is at a minimum distance. On the contrary, in the upper end position the distance between the vehicle cab roof and the inner surface of the wind deflector facing the cab roof of the vehicle is at a maximum distance.

An advantage is that an automated method is provided which measures air pressure values within the space formed by the wind deflector and the cab roof of the vehicle for different positions of the wind deflector, and thereafter sets the wind deflector at a position corresponding to the suitable air pressure. Hereby, and as described above, a reduction of the air resistance is provided as an increased air pressure within the space formed by the wind deflector and the cab roof of the vehicle corresponds to a reduced air resistance for the vehicle. Thus, when for example connecting a trailer with other dimensions compared to a previously connected trailer, the method can be executed and the wind deflector can be arranged at a new and more suitable position.

According to an example embodiment, the method may comprise the steps of measuring the air pressure within the space formed by the wind deflector and the cab roof of the vehicle for a plurality of positions of the wind deflector; and positioning the wind deflector in a position corresponding to a pressure level being higher than a mean pressure level for the plurality of positions of the wind deflector.

Hereby, an advantage is that the air pressure level for further positions of the wind deflector may be received and further improvements with regards to reducing the air resistance is provided. Thus, a mean air pressure level is calculated/determined for the plurality of positions of the wind deflector and the wind deflector is thereafter positioned at a position which has a measured air pressure value which is higher than the calculated/determined mean air pressure level.

According to an example embodiment, the method may comprise the step of positioning the wind deflector in the position corresponding to the highest measured air pressure level. Hereby, a substantially optimized position of the wind deflector may be provided in order to reduce the air resistance of the vehicle.

According to an example embodiment, the step of measuring the air pressure within the space formed by the wind deflector and the cab roof of the vehicle may be executed when moving the wind deflector from the first position towards the second position.

Hereby, the wind deflector is executing a sweeping motion between the first and second positions. The first and second positions may be first and second end positions of the wind deflector. However, a control unit or the like may have stored information with regards to e.g. statistical positions at which the wind deflector is most often arranged. In such situations, the first and second positions may correspond to minimum and maximum positions of such statistical positions. The stored first and second positions may also correspond to specific trailers/cargos connected to the vehicle. Hence, for a specific trailer/cargo the wind deflector may be moved from a first position towards a second position, at which range it is most likely that the final position of the wind deflector will be provided. The measuring step may be executed continuously or sampled at suitable frequencies when moving the wind deflector from the first position towards the second position.

Executing the sweeping motion is beneficial since a plurality of measured values can be obtained within a relatively short time span, so that environmental indifferences, such as e.g. side wind variations, hill climb, slopes or similar, will have a minimum influence.

According to an example embodiment, information may be received with regards to predictive road data such that a calibration sequence for calibrating the positioning of the wind deflector may be executed at road partitions suitable for doing so, such as e.g. on a flat, essentially straight road, which has a small amount of indifferent influences.

According to an example embodiment, the method may comprise the steps of moving the wind deflector from the second position towards the first position; and measuring the air pressure within the space formed by the wind deflector and the cab roof of the vehicle for a plurality of positions of the wind deflector when moving the wind deflector from the second position towards the first position.

Hereby, a second set of measured values can be obtained which can be compared to the corresponding values obtained when moving the wind deflector from the first position towards the second position.

For each and every sample of pressure recorded during the movement of the air deflector, a corresponding value indicative of the position of the roof deflector may be measured and recorded, so that every combined data pair of position and pressure is stored.

According to an example embodiment, the method may further comprise the steps of determining a mean air pressure value for each of the plurality of positions of the wind deflector after moving the wind deflector from the first position towards the second position and from the second position towards the first position; determining a position of the wind deflector corresponding to a maximum mean pressure value of the determined mean air pressure values; and positioning the wind deflector at the position corresponding to the maximum mean pressure value.

Air pressure values may be different when moving the wind deflector from the first position towards the second position in comparison to when moving the wind deflector from the second position towards the first position. A reason for this is due to the phenomena of hysteresis. Typically, in a motion for the roof deflector going from a lower position to an upper position, the vortex, or swirling motion that is characteristic for the case when the wind deflector is in a low position, may still be persisting for a position of the wind deflector which has actually slightly passed the point of optimum aerodynamics. On the contrary, when moving the wind deflector from an upper position towards a lower position, the swirling motion may not be established until the position of the roof deflector has actually slightly passed the point of optimum aerodynamics on it's way down. By moving the wind deflector in two directions and thereafter use a mean value can therefore improve the accuracy of positioning the wind deflector, and reduce the influence of the hysteresis effect.

Furthermore, the method described above may be executed at predetermined intervals in order to calibrate the positioning of the wind deflector. Also, the method may be arranged in conjunction with a Global Positioning System (GPS) or the like, such as e.g. via a control unit. The method may then be executed in response to a signal received from the GPS, which signal being indicative of a change in driving direction. Hereby, the change in driving direction may correspond to a change in approaching wind direction for the vehicle which may affect the optimum position of the wind deflector.

Further effects and features of the third aspect are largely analogous to those described above in relation to the first and second aspects.

According to a fourth aspect of the present invention, there is provided a control unit configured to control a wind deflector arrangement comprising a wind deflector configured to reduce air resistance, the wind deflector being arranged on a cab roof of a vehicle, the wind deflector being pivotable around a substantially transversal axis and movable between a first and a second position, wherein the wind deflector arrangement comprises at least one air pressure sensor arranged within a space formed by the wind deflector and the cab roof of the vehicle for measuring an air pressure, wherein the control unit is configured to receive output data from the at least one air pressure sensor for at least two different positions of said wind deflector; determine which of the at least two different positions of the wind deflector corresponds to the highest air pressure; and position the wind deflector in the position corresponding to the highest air pressure.

The control unit may thus be arranged to receive data and perform calculations/determinations as described above in relation to the third aspect of the present invention.

According to an example embodiment, the control unit may be further configured to receive a signal indicative of a dimension and/or position of a trailer/cargo connected to the vehicle; store the position of the wind deflector as a position corresponding to the dimension and/or position of the trailer/cargo.

The signal may relate to the trailer/cargo height/elevation, i.e. the vertical distance between the cab roof of the vehicle and the upper surface of the trailer/cargo. The signal may also relate to the longitudinal distance between the cab of the vehicle and the trailer. Hereby, an advantage is that the control unit may be arranged to initially position the wind deflector at a relatively optimum position when connecting a trailer/cargo having dimensions similar, or equal, to a previously connected trailer/cargo.

Effects and features of the fourth aspect are largely analogous to those described above in relation to the previously described aspects of the present invention.

According to a fifth aspect of the present invention, there is provided a computer program comprising program code means for performing any of the above described steps in relation to the third aspect when the program is run on a computer.

According to a sixth aspect of the present invention, there is provided a computer readable medium carrying a computer program comprising program means for performing any of the above described steps in relation to the third aspect when the program product is run on a computer.

Effects and features of the fifth and sixth aspects of the present invention are largely analogous to those described above in relation to the previously described aspects of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional features and advantages of the present invention, will be better understood through the following illustrative and non-limiting detailed description of exemplary embodiments of the present invention, wherein:

FIG. 3b is an example embodiment illustrating a side view of the vehicle in FIG. 1 when the wind deflector is positioned higher than the lower end position depicted in FIG. 3a;

DETAILED DESCRIPTION

Figure 1:
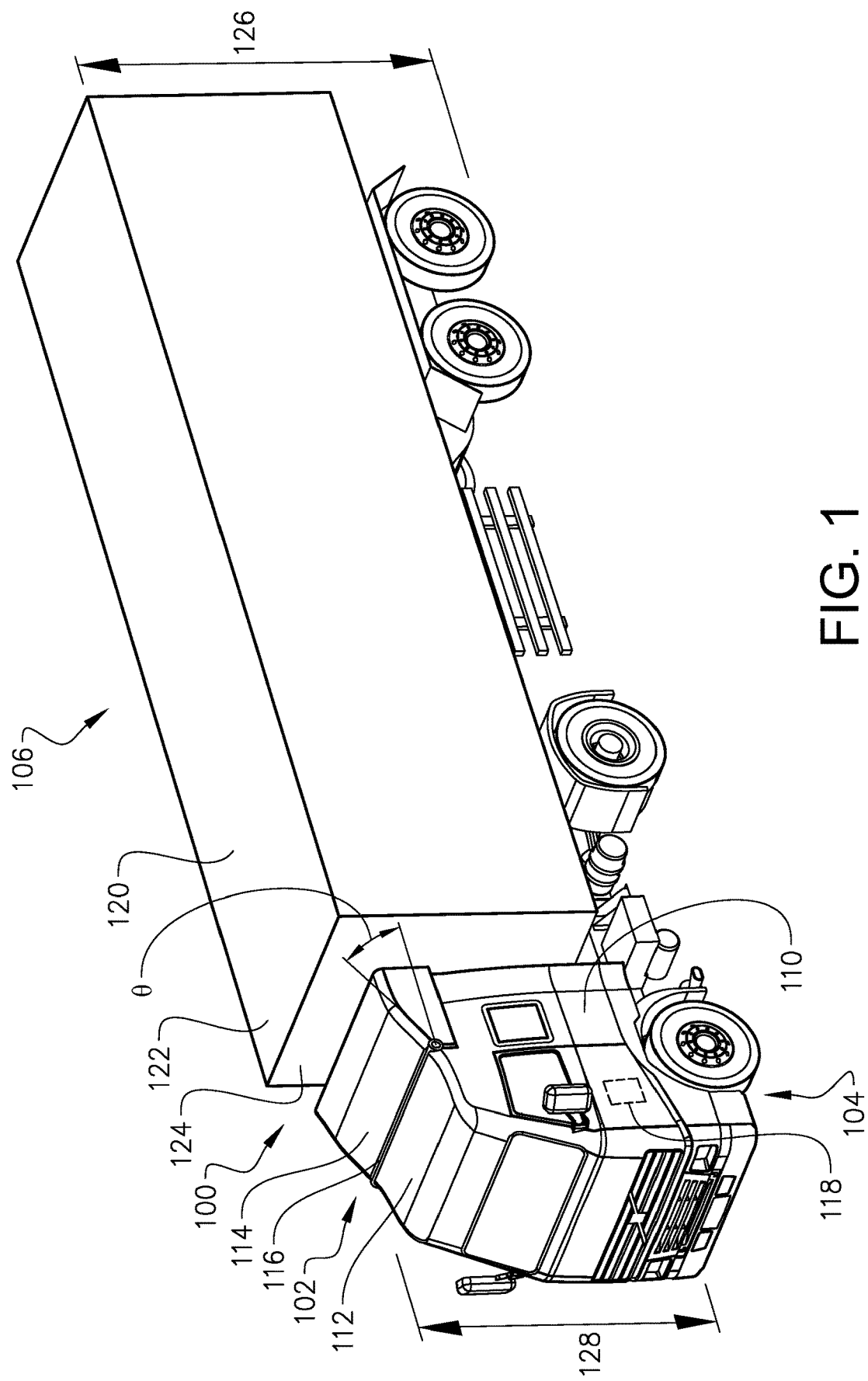
FIG. 1 is a perspective view of a vehicle comprising a wind deflector arrangement according to an example embodiment.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Reference is made to FIG. 1 which is a perspective view of a vehicle 100 comprising a wind deflector arrangement 102 according to an example embodiment of the present invention. The vehicle 100 illustrated in FIG. 1 comprises a tractor unit 104 and a rear part 106. The rear part 106 is in FIG. 1 a trailer unit 106 which is releasably connected to the tractor unit 104. The following will therefore refer the rear part as the trailer unit 106. Furthermore, the tractor unit 106 comprises a cab 110 in which a vehicle operator operates the vehicle 100. The cab 110 comprises a cab roof 112 onto which a wind deflector 114 of the wind deflector arrangement 102 is connected. In particular, and as depicted in FIG. 1, the wind deflector 114 is pivotally connected to the cab roof 112 of the vehicle 100 around a substantially transversal geometric axis 116. Hence, the wind deflector 114 is thus able to rotate around the substantially transversal geometric axis 116 by means of a deflection angle θ in order to be positioned in various positions.

Furthermore, the trailer unit 106 of the vehicle 100 comprises cargo 120, which in FIG. 1 is illustrated as a container arranged as an integral part of the trailer 106. The container 120 may however be arranged as a releasable part to the trailer unit 106 of the vehicle 100. Furthermore, and as depicted in FIG. 1, the upper surface 122 of the trailer 106, or the container 120, is arranged at a vertical elevation which is higher than the vertical elevation of the cab roof 112 of the tractor unit 104 of the vehicle 100. More particularly, a height 126 of the trailer unit 106, or the container 120, is higher than a height 128 of the cab roof 112 of the vehicle 100. Thus, during traveling of the vehicle 100, portions of a front surface 124 of the trailer 106, or container 120, will constitute an air resistance for the vehicle 100. This will be further described in relation to FIGS. 3a and 3b below.

Figure 2:
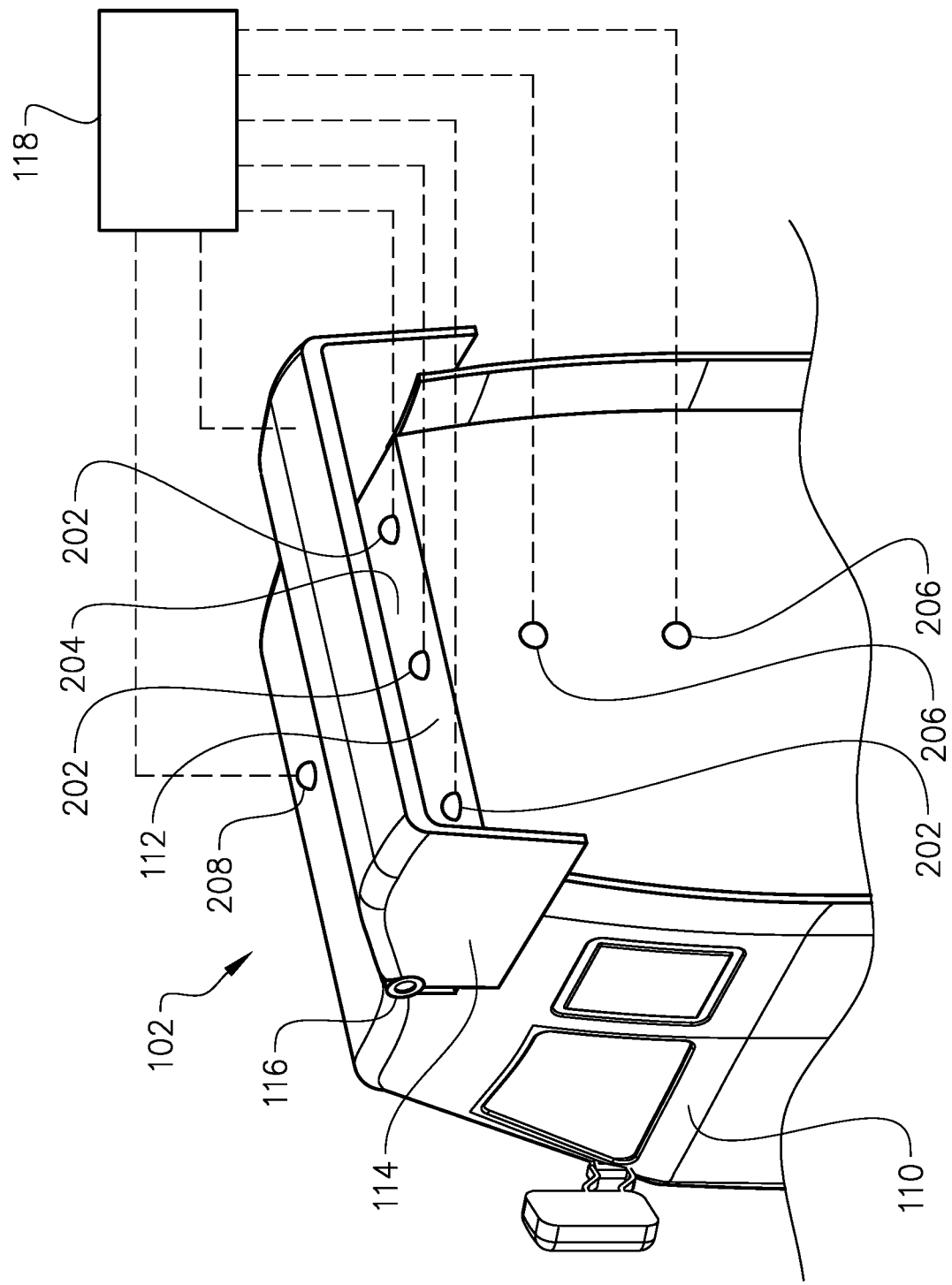
FIG. 2 is a perspective view illustrating suitable positions for the air pressure sensors according to an example embodiment.

Turning to FIG. 2, which is a perspective view illustrating the cab 110 of the vehicle 100 at an angle from behind. As illustrated in FIG. 2, the wind deflector arrangement 102 comprises at least one air pressure sensor 202 arranged within a space 204 formed by the wind deflector 114 and the cab roof 112 of the vehicle 100. In the example embodiment depicted in FIG. 2, the wind deflector arrangement 102 comprises three air pressure sensors 202 connected to the cab roof 112 of the vehicle 100 and spaced apart from each other as seen in the transversal direction of the vehicle 100. Although FIG. 2 illustrates that the air pressure sensors 202 are positioned on the cab roof 112 of the vehicle 100, other positions within the space formed by the wind deflector 114 and the cab roof 112 are conceivable, such as e.g. on an inner surface of the wind deflector 114 facing the cab roof 112, or on inner side surfaces of the wind deflector 114 which are substantially perpendicular to the cab roof 112. The air pressure sensors 202 as well as the wind deflector 114 are connected to a control unit 118. The control unit 118 is schematically illustrated in FIG. 2 and illustrated in FIG. 1 as arranged within the tractor unit 104 of the vehicle 100. The control unit 118 is thus arranged to receive output data in the form of air pressure values from the air pressure sensors 202 and, based on the received output, control the motion and angular displacement of the wind deflector 114.

Furthermore, and as depicted in FIG. 2, the wind deflector arrangement 102, or the air pressure sensor 202, comprises at least one additional air pressure sensor 206. In FIG. 2, two additional air pressure sensors 206 are depicted. The additional air pressure sensors 206 are preferably arranged on a rear surface of the cab 110 as seen in the forward driving direction of the vehicle 100. Hence, the additional air pressure sensors 206 are arranged to face the trailer unit 106 connected to the tractor unit 104. The additional air pressure sensors 206 are also connected to the control unit 118 for delivery of output data in the form of air pressure signals to the control unit 118.

Still further, the air pressure sensor 202 may preferably be a differential air pressure sensor. The differential air pressure sensor comprises at least one reference air pressure measuring device 208. By means of the differential air pressure sensor, a difference in air pressure is measured between the air pressure sensor 202 arranged within the space formed by the wind deflector 114 and the cab roof 112 and the reference air pressure measuring device 208. A difference in air pressure between the additional air pressure sensor 206 and the reference air pressure measuring device 208 may also be measured. Hence, the reference air pressure measuring device 208 may be connected to the control unit 118. The control unit 118 thus calculates/measures the difference in air pressure. As depicted in FIG. 2, the reference air pressure measuring device 208 is arranged on the cab roof 112 in front of the substantially transversal axis 116 as seen in the forward driving direction of the vehicle 100. At the position chosen to be the reference position, the air pressure is relatively stationary. The reference air pressure measuring device 208 may however be arranged at other positions of the vehicle, such as within the cab 110, or in any position where the pressure is relatively stable in relation to the pressure detected/measured in the space 204 formed by the wind deflector 114 and the cab roof 112 of the vehicle.

It should be readily understood that although not depicted in FIG. 2, the control unit 118 may be connected to an actuator or the like of the wind deflector arrangement 102. The actuator is thus arranged to control the angular displacement of the wind deflector 114.

Figure 3A:
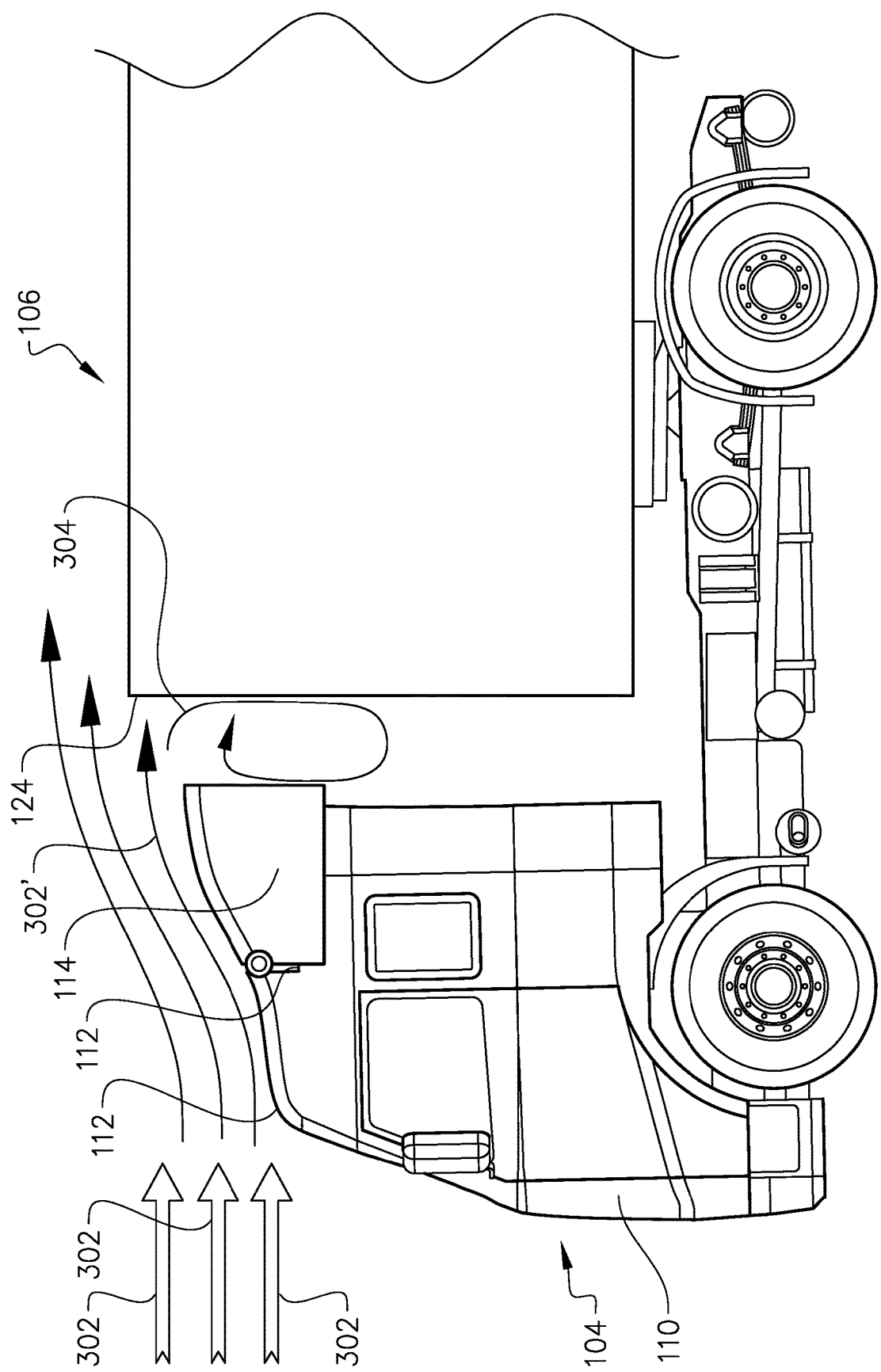
FIG. 3a is an example embodiment illustrating a side view of the vehicle in FIG. 1 when the wind deflector is positioned in a lower end position.
Figure 3B:
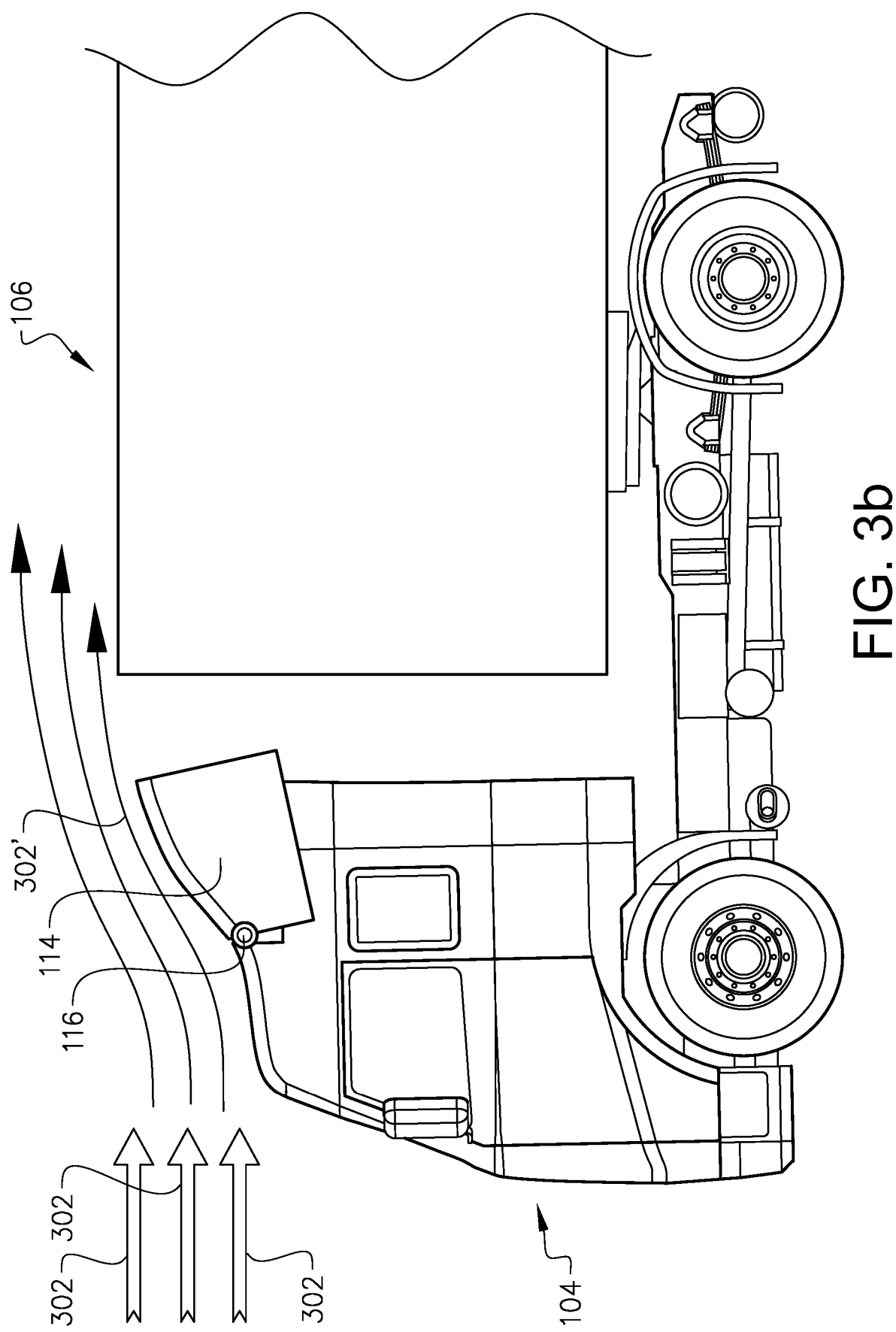

Now, reference is made to FIGS. 3a and 3b which illustrate side views of the vehicle 100 having the wind deflector 114 arranged in two different positions. In more detail, FIG. 3a illustrates the wind deflector 114 arranged in a lower end position while in FIG. 3b, the wind deflector 114 is arranged in a position higher than the position depicted in FIG. 3a.

Firstly, reference is made to FIG. 3a which illustrates the wind deflector 114 arranged in the lower end position. Hence, a vertical distance between the wind deflector 114 and the cab roof 112 is minimized. Also, the highest point of the wind deflector 114, as seen in the vertical direction of the vehicle, is lower than the height 126 of the trailer 106.

During traveling in a forward direction of the vehicle 100, the vehicle 100 is exposed to an approaching wind flow 302. In FIGS. 3a and 3b, the wind flow 302 is depicted as being directed in a direction straight ahead towards the vehicle 100 and it should be readily understood that the present invention functions also for wind flows at an angle from the side of the vehicle, i.e. for side winds. As can be seen in FIG. 3a, the wind flow 302 follows an aerodynamic path over the cab roof 112 and the wind deflector 114. However, since the wind deflector 114 is arranged in the lower end position, a portion 302' of the wind flow 302 hits an upper portion of the front surface 124 of the trailer unit 106. Hereby, the upper portion of the front surface 124 of the trailer unit 106 constitutes an air resistance for the vehicle 100 which will e.g. increase the fuel consumption of the vehicle.

Furthermore, the portion 302' of the wind flow 302 hitting the upper portion of the front surface 124 of the trailer unit 106 generates an air vortex 304 between the cab of the vehicle 100 and the trailer unit 106. More particularly, the air vortex 304 is generated generally between the space 204 formed by the wind deflector 114 and the cab roof 112 and the trailer 106. Hereby, the air pressure within the space 204 formed by the wind deflector 114 and the cab roof 112 is being reduced due to the swirling motion of the flow path trapped between the tractor and the trailer. This air pressure is, as described above in relation to FIG. 2, detected and measured by the at least one air pressure sensor 202. The lowest pressure will be located at the core of the swirling motion, but due to practical reasons, it will be much more convenient to measure the influence of this low pressure in a position closer to the cab surface. Thus, according to an example, the pressure may also be measured not directly on the cab surface, but also on a spear, or stick, protruding backwards from the cab roof or cab rear wall into the swirling flow path 304.

Depending on the longitudinal distance between the truck unit 104 and the front surface 124 of the trailer unit 106, the air vortex 304 may be generated further vertically downwards in the space between the cab 110 and the trailer unit 106. Hereby, a reduction in air pressure may be detected and measured also by means of the at least one additional air pressure sensor 206.

Turning to FIG. 3b, the wind deflector 114 is arranged in a position being higher than the lower end position depicted in FIG. 3a. Accordingly, the wind deflector 114 has been rotated around the generally transversal axis 116. Hereby, and as depicted in FIG. 3b, the portion 302' of the wind flow 302 hitting the upper portion of the front surface 124 of the trailer unit 106 in FIG. 3a is now instead forming a streamlined wind flow 302 over the cab roof 112, the wind deflector 114 and the trailer unit 106. Hereby, substantially no air vortex, as depicted in FIG. 3a, is generated and the wind deflector 114 is thus arranged at a substantially optimal position.

The above description in relation to FIGS. 3a and 3b have mainly been relating to the wind deflector 114 being arranged in a too low position and in a relatively optimal position. In case the wind deflector 114 is arranged in a too high position, i.e. the wind deflector 114 is rotated too severely around the generally transversal axis 116, the wind deflector 114 itself acts as an air resistance for the vehicle 100 which is also not optimal for the vehicle 100. In this, too high, position, the air flow is excessively accelerated when forced over the wind deflector, with an associated lower pressure as a consequence, influencing the area between tractor and trailer, and consequently, also the area between cab roof and roof deflector.

With this, the core of the invention thus relies on the insight that both instances of roof deflector set "too low", or set "too high", will be associated with a relative low pressure, and the optimum position is when the pressure reaches a maximum.

Figure 4:
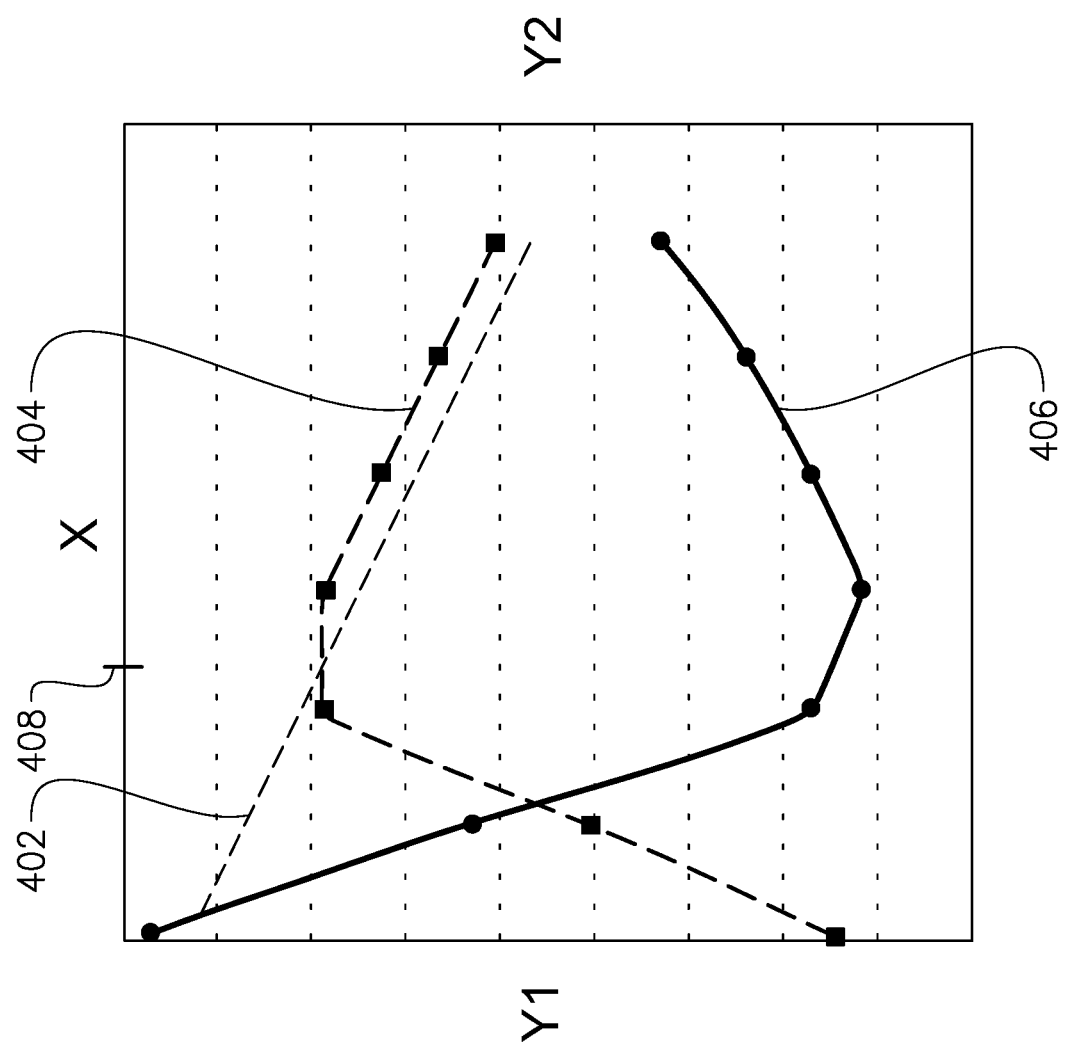
FIG. 4 is a graph illustrating an example embodiment of the relation between air pressure and air resistance in dependence of the position of the wind deflector.

Turning now to FIG. 4 which is a graph illustrating an example embodiment of the relationship between the measured air pressure and the air resistance for the vehicle in dependence of the position of the wind deflector 114. The position of the wind deflector 114 is indicated by the dashed line 402. The X-axis corresponds to the deflection angle θ of the wind deflector 114, where the position to the right corresponds to an increased angle in comparison to the position to the left. Hence, the far most right position in the graph corresponds to an upper position of the wind deflector 114.

The measured air pressure, which is measured by e.g. the air pressure sensors 202 arranged within the space 204 formed by the wind deflector 114 and the cab roof 112, is depicted by means of the dashed line provided with rectangles 404, while the air resistance of the vehicle, or aerodynamic drag of the vehicle, is indicated by means of the solid line with circles 406. Hence, the Y1-axis corresponds to the measured air pressure and the Y2-axis corresponds to a measured air resistance/aerodynamic drag force.

The following will describe the phenomena illustrated in FIG. 4 by means of moving from the right to the left in the graph.

Thus, when moving from the right in the graph depicted in FIG. 4, the wind deflector 114 is moved from an upper position towards a lower position. As can be seen, when moving the wind deflector 114 downwards, the air pressure within the space 204 formed by the wind deflector 114 and the cab roof 112 continuously increases due to the reduced amount of air acceleration being present over the edge of the wind deflector. At the same time, the air resistance of the vehicle is continuously reduced. In other words, at a first instance the air resistance is relatively high due to the high position of the wind deflector 114. When the wind deflector 114 moves downwardly, the air pressure increases and the air resistance decreases until the wind deflector 114 is arranged at a relatively optimum position, indicated by numeral 408 on the X-axis.

When the wind deflector 114 thereafter is moved further downwardly, i.e. further to the left of the relatively optimum position 408 on the X-axis, the portion 302' of the wind flow 302 described above in relation to FIG. 3a hits the upper portion of the front surface 124 of the trailer unit 106. Hereby, during the downward motion of the wind deflector 114, the air starts to rotate in a swirling motion and the corresponding air pressure within the space 204 formed by the wind deflector 114 and the cab roof 112 is continuously reduced and the air resistance/aerodynamic drag force is continuously increased.

Accordingly, FIG. 4 clearly illustrates the unexpected relationship between the air pressure within the space 204 formed by the wind deflector 114 and the cab roof 112 and the air resistance of the vehicle 100. As depicted in FIG. 4, the pressure level in the position between the wind deflector and the cab roof is in a very strong inverse- or anti-correlation with the vehicle aerodynamic drag.

Figure 5:
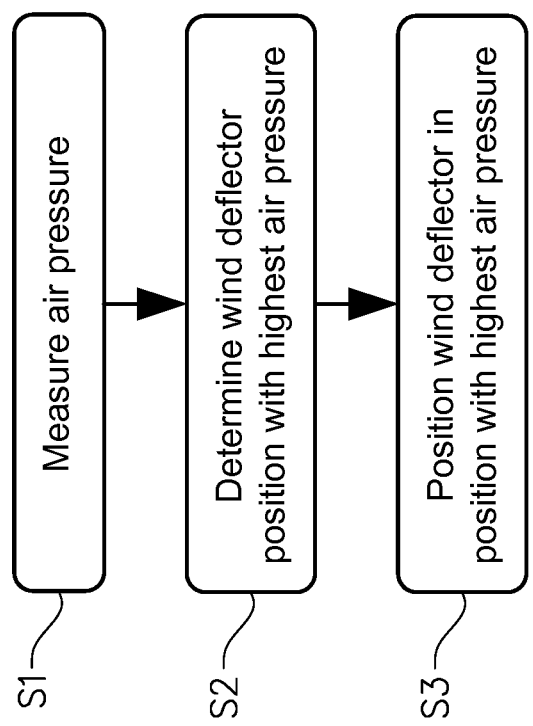
FIG. 5 is a flow chart of an exemplary method for improving the positioning of the wind deflector.
Figure 6:
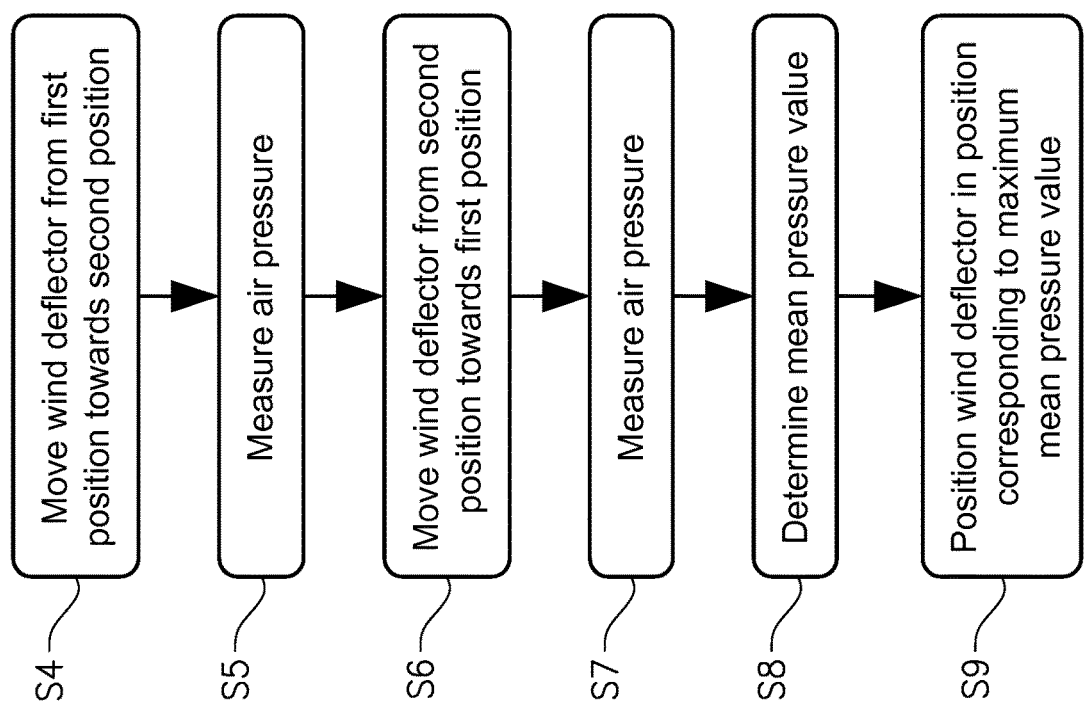
FIG. 6 is a flow chart of another exemplary method for improving the positioning of the wind deflector

Now, in order to describe the method for controlling the wind deflector, reference is made to FIGS. 5 and 6 illustrating flow charts of example embodiment for improving the position of the wind deflector.

Firstly, and with reference to FIG. 5, when executing the method for controlling the wind deflector arrangement 102, the air pressure within the space 204 formed by the wind deflector 114 and the cab roof 112 is measured S1 for at least two positions of the wind deflector 114. Thereafter, it is determined S2 which of the at least two different positions of the wind deflector 114 that corresponds to the highest air pressure. Finally, the wind deflector 114 is positioned S3 in the position corresponding to the highest air pressure. It should thus be readily understood that if only two different positions of the wind deflector 114 is evaluated, the wind deflector is positioned in the position corresponding to the highest air pressure, while if a plurality of positions of the wind deflector 114 is evaluated, the wind deflector 114 may be positioned in a position corresponding to a pressure value which is higher than a mean pressure value for all of the measured positions of the wind deflector 114. Naturally, the wind deflector 114 may also be positioned in the position of the wind deflector 114 corresponding to the absolute highest air pressure.

The step of measuring the air pressure within the space 204 formed by the wind deflector 114 and the cab roof 112 may be executed when moving the wind deflector up and down and/or down and up. Therefore, reference is made to FIG. 6 which is a flow chart of another example embodiment for improving the position of the wind deflector.

Firstly, the wind deflector 114 is moved S4 from the first position towards the second position. According to a non-limiting example, the first position may be a lower end position and the wind deflector 114 is thus moved towards an upper position. During the movement from the first position towards the second position of the wind deflector 114, the air pressure within the space 204 formed by the wind deflector 114 and the cab roof 112 is measured S5. Thereafter, the wind deflector 114 is moved S6 in the opposite direction from the second position towards the first position. During the movement from the second position towards the first position of the wind deflector 114, the air pressure within the space 204 formed by the wind deflector 114 and the cab roof 112 is once again measured S7. Preferably, the air pressure is measured at approximately similar positions of the wind deflector 114 when moving S4 the wind deflector 114 from the first position towards the second position as when moving S6 the wind deflector from the second position towards the first position.

Thereafter, a mean pressure value for each of the positions of the wind deflector 114 is determined S8. This can be determined/calculated by means of the control unit 118 as described above in relation to FIG. 2. Hence, for each of the positions of the wind deflector 114, a mean air pressure value is determined. Finally, a maximum value of the mean pressure values is determined and the wind deflector 114 is positioned S9 in the position corresponding to the maximum mean pressure value.

It is to be understood that the present invention is not limited to the embodiments described above and illustrated in the drawings; rather, the skilled person will recognize that many changes and modifications may be made within the scope of the appended claims.

The invention claimed is:

1. A wind deflector arrangement comprising a wind deflector configured to reduce air resistance, the wind deflector being arranged on a cab roof of a vehicle, the wind deflector being pivotable around a substantially transversal axis of the vehicle, wherein the wind deflector arrangement further comprises at least one air pressure sensor for measuring an air pressure during traveling of the vehicle, wherein the at least one air pressure sensor is arranged within a space formed by the wind deflector and the cab roof of the vehicle.

2. The wind deflector arrangement according to claim 1, wherein the wind deflector is configured to reduce air resistance of a rear part of the vehicle, wherein a height of the rear part is higher than a height of the cab roof of the vehicle.

3. The wind deflector arrangement according to claim 1, further comprising a control unit connected to the at least one air pressure sensor.

4. The wind deflector arrangement according to claim 3, wherein the control unit is configured to control an angular displacement of the wind deflector around the substantially transversal axis.

5. The wind deflector arrangement according to claim 1, wherein the at least one air pressure sensor is arranged on the cab roof of the vehicle.

6. The wind deflector arrangement according to claim 1, wherein the at least one air pressure sensor is arranged on a surface of the wind deflector facing the cab roof of the vehicle.

7. The wind deflector arrangement according to claim 1, wherein the wind deflector arrangement comprises a plurality of air pressure sensors mutually spaced apart from each other in the transversal direction of the vehicle.

8. The wind deflector arrangement according to claim 1, wherein the air pressure sensor comprises an additional air pressure sensor arranged on an external surface of the vehicle facing away from a forward driving direction thereof.

9. The wind deflector arrangement according to claim 1, wherein the at least one air pressure sensor is a differential air pressure sensor comprising at least one air pressure measuring device arranged within the space formed by the wind deflector and the cab roof of the vehicle and at least one reference air pressure measuring device.

10. The wind deflector arrangement according to claim 9, wherein a control unit is configured to measure a difference in pressure level between the at least one air pressure measuring device and the at least one reference air pressure measuring device.

11. The wind deflector arrangement according to claim 9, wherein the at least one reference air pressure measuring device is arranged in front of the substantially transversal axis as seen in a forward driving direction of the vehicle or within a cab compartment of the vehicle.

12. The wind deflector arrangement according to claim 1, wherein the at least one air pressure sensor is an absolute air pressure sensor arranged to measure an absolute air pressure.

13. A vehicle comprising a vehicle cab compartment and the wind deflector arrangement according to claim 1, wherein the wind deflector arrangement comprises the wind deflector mounted on a cab roof of the vehicle and configured to reduce air resistance of the vehicle.

14. The vehicle according to claim 13, the vehicle further comprising a truck unit comprising the vehicle cab compartment, and a rear part arranged behind the truck unit as seen in a forward driving direction of the vehicle, wherein a height of the rear part is higher than a height of the cab roof of the vehicle.

15. A method for controlling a wind deflector arrangement comprising a wind deflector for reducing air resistance, the wind deflector being arranged on a cab roof of a vehicle, the wind deflector being pivotable around a substantially transversal axis and movable between a first and a second position, wherein the wind deflector arrangement comprises at least one air pressure sensor arranged within a space formed by the wind deflector and the cab roof of the vehicle for measuring an air pressure, the method comprising the steps of:
measuring the air pressure within the space formed by the wind deflector and the cab roof of the vehicle for at least two different positions of the wind deflector;
determining which of the at least two different positions of the wind deflector corresponds to a highest measured air pressure; and
positioning the wind deflector in a position corresponding to the highest measured air pressure.

16. The method according to claim 15, comprising the steps of:
measuring the air pressure within the space formed by the wind deflector and the cab roof of the vehicle for a plurality of positions of the wind deflector; and
positioning the wind deflector in a position corresponding to a pressure level being higher than a mean pressure level for the plurality of positions of the wind deflector.

17. The method according to claim 15, wherein the step of measuring the air pressure within the space formed by the wind deflector and the cab roof of the vehicle is executed when moving the wind deflector from the first position towards the second position.

18. The method according to claim 17, further comprising the steps of:
- moving the wind deflector from the second position towards the first position; and
- measuring the air pressure within the space formed by the wind deflector and the cab roof of the vehicle for a plurality of positions of the wind deflector when moving the wind deflector from the second position towards the first position.

19. The method according to claim 18, further comprising the steps of:
- determining a mean air pressure value for each of the plurality of positions of the wind deflector after moving the wind deflector from the first position towards the second position and from the second position towards the first position;
- determining a position of the wind deflector corresponding to a maximum mean pressure value of the determined mean air pressure values; and
- positioning the wind deflector at the position corresponding to the maximum mean pressure value.

20. A control unit configured to control a wind deflector arrangement comprising a wind deflector configured to reduce air resistance, the wind deflector being arranged on a cab roof of a vehicle, the wind deflector being pivotable around a substantially transversal axis and movable between a first and a second position, wherein the wind deflector arrangement comprises at least one air pressure sensor arranged within a space formed by the wind deflector and the cab roof of the vehicle for measuring an air pressure, wherein the control unit is configured to:
- receive output data from the at least one air pressure sensor for at least two different positions of the wind deflector;
- determine which of the at least two different positions of the wind deflector corresponds to a highest air pressure; and
- position the wind deflector in the position corresponding to the highest air pressure.

21. The control unit according to claim 20, wherein the control unit is further configured to:
- receive a signal indicative of a dimension and/or position of a rear part connected to the vehicle; and
- store the position of the wind deflector as a position corresponding to the dimension and/or position of the rear part.

22. A computer comprising a computer program for performing the steps of claim 15 when the computer program is run on the computer.

23. A non-transitory computer readable medium carrying a computer program for performing the steps of claim 15 when the computer program is run on a computer.

* * * * *